United States Patent
Braedt et al.

(10) Patent No.: US 10,421,316 B2
(45) Date of Patent: Sep. 24, 2019

(54) FREEWHEEL HUB FOR A BICYCLE

(71) Applicant: SRAM Deutschland GmbH, Schweinfurt (DE)

(72) Inventors: Henrik Braedt, Hambach (DE); Joachim Göbel, Hambach (DE); Vasco Correia, Coimbra (PT); David Boughton, Würzburg (DE)

(73) Assignee: SRAM DEUTSCHLAND GMBH, Schweinfurt (DE)

( * ) Notice: Subject to any disclaimer, the term of this patent is extended or adjusted under 35 U.S.C. 154(b) by 527 days.

(21) Appl. No.: 15/209,366

(22) Filed: Jul. 13, 2016

(65) Prior Publication Data

US 2017/0015137 A1    Jan. 19, 2017

(30) Foreign Application Priority Data

Jul. 13, 2015    (DE) .................. 10 2015 009 143

(51) Int. Cl.
| | |
|---|---|
| *B60B 27/04* | (2006.01) |
| *F16D 41/24* | (2006.01) |
| *F16D 41/36* | (2006.01) |
| *F16D 27/01* | (2006.01) |
| *B60B 27/02* | (2006.01) |

(52) U.S. Cl.
CPC .......... *B60B 27/047* (2013.01); *B60B 27/023* (2013.01); *F16D 27/01* (2013.01); *F16D 41/24* (2013.01); *F16D 41/36* (2013.01); *B60B 2900/111* (2013.01); *B60B 2900/131* (2013.01); *B60B 2900/133* (2013.01); *B60Y 2200/134* (2013.01)

(58) Field of Classification Search
CPC ................ B60B 27/023; B60B 27/047; B60B 2900/131; B60B 2900/133; F16D 41/24; F16D 41/36; F16D 27/01
See application file for complete search history.

(56) References Cited

U.S. PATENT DOCUMENTS

| | | |
|---|---|---|
| 728,376 A | 5/1903 | Davis |
| 2,800,986 A | 7/1957 | Der et al. |

(Continued)

FOREIGN PATENT DOCUMENTS

| | | |
|---|---|---|
| DE | 19847673 A1 | 4/2000 |
| DE | 202011108822 U1 | 2/2012 |

(Continued)

*Primary Examiner* — Richard M Lorence

(57) ABSTRACT

The present invention relates to a freewheel hub for a bicycle, comprising a freewheel device which optionally allows relative rotation between a hub sleeve and a driver or couples the hub sleeve and the driver in a torque-transmitting manner. The freewheel device has at least one first clutch ring and at least one second clutch ring, wherein the first clutch ring is coupled or coupleable to the hub sleeve in a torque-transmitting manner, and wherein the second clutch ring is coupleable or coupled to the driver in a torque-transmitting manner, and wherein the first and the second clutch ring are displaceable axially relative to the hub axle between an engaged position and a freewheel position. Provision is made here for at least one magnet arrangement accommodated in apertures in the first clutch ring to keep the clutch rings in the engaged position.

26 Claims, 11 Drawing Sheets

(56) References Cited

U.S. PATENT DOCUMENTS

| | | | |
|---|---|---|---|
| 4,593,799 | A | 6/1986 | Ozaki |
| 5,676,227 | A | 10/1997 | Hugi |
| 5,964,332 | A | 10/1999 | King |
| 6,588,564 | B1 | 7/2003 | Jager et al. |
| 7,059,686 | B2 | 6/2006 | Kanehisa |
| 7,562,755 | B2 | 7/2009 | Spahr |
| 7,766,143 | B1 | 8/2010 | Chen |
| 8,875,862 | B2 * | 11/2014 | Lin ................. F16D 41/32 192/46 |
| 2009/0255774 | A1 | 10/2009 | Hsu |
| 2014/0060992 | A1 | 3/2014 | Spahr et al. |
| 2014/0062164 | A1 * | 3/2014 | Spahr ............... F16D 27/01 301/6.9 |
| 2014/0110208 | A1 | 4/2014 | Braedt |
| 2014/0238808 | A1 | 8/2014 | Lai |
| 2015/0060224 | A1 * | 3/2015 | Lee ................. B60B 27/023 192/45.004 |

FOREIGN PATENT DOCUMENTS

| | | |
|---|---|---|
| DE | 102012016945 A1 | 3/2014 |
| DE | 102012020472 A1 | 4/2014 |
| DE | 102012016949 A1 | 5/2014 |
| EP | 1798058 A2 | 6/2007 |
| EP | 2599643 A1 | 6/2013 |
| GB | 191227136 A | 11/1913 |

\* cited by examiner

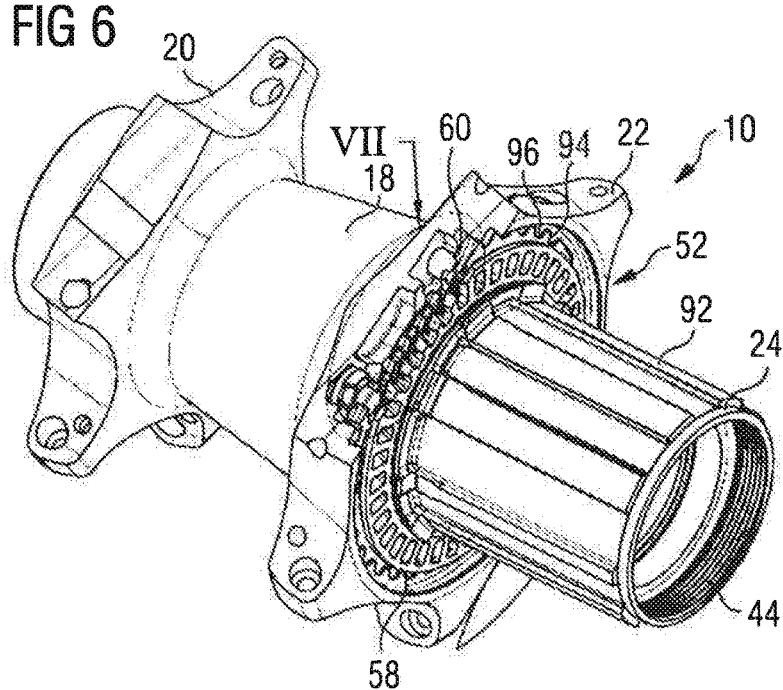
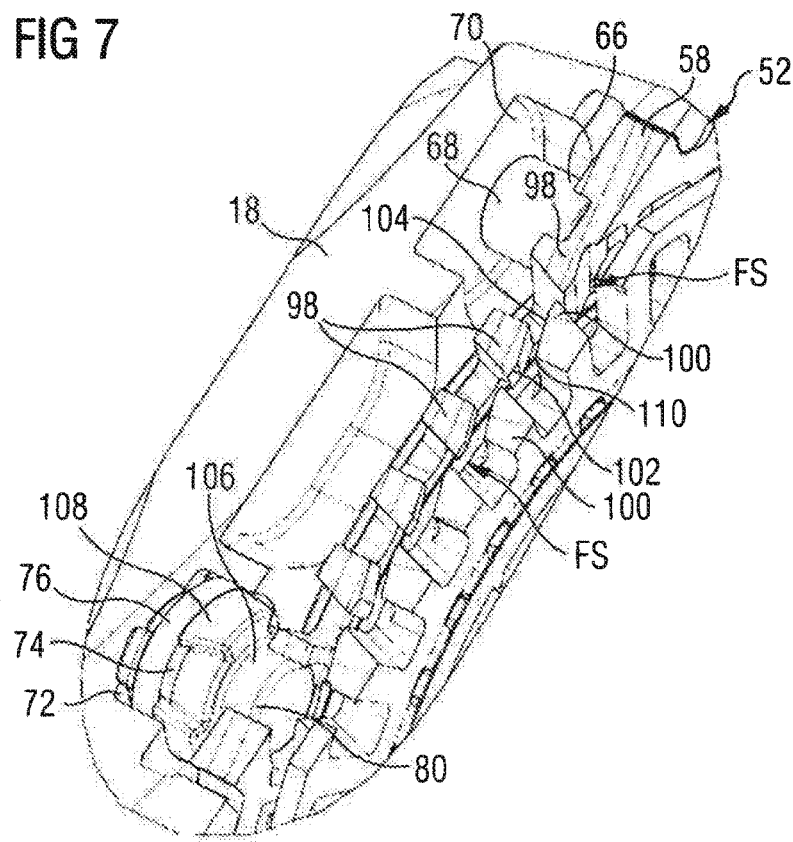

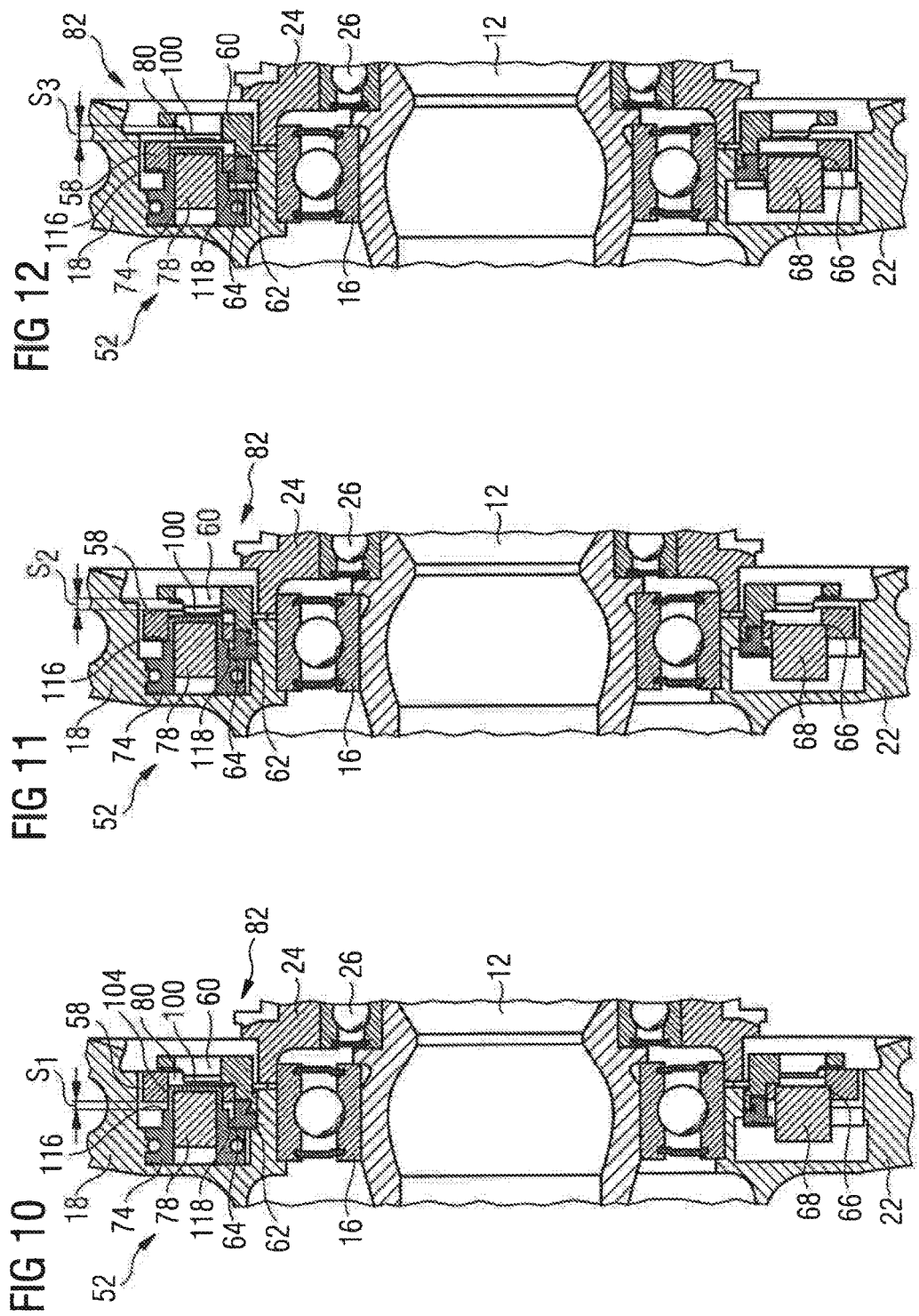

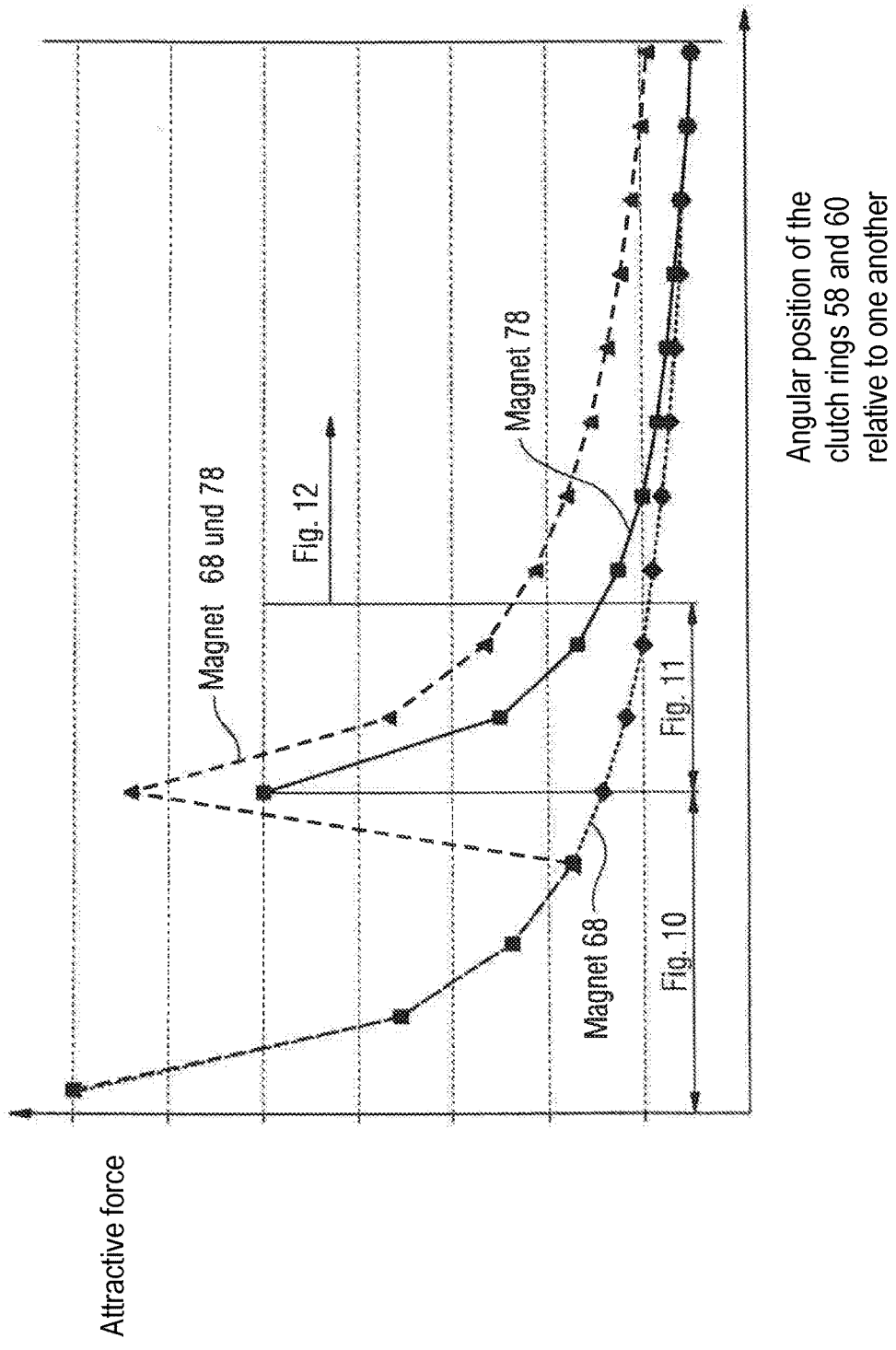

FREEWHEEL HUB FOR A BICYCLE

This application claims priority to, and/or the benefit of, German patent application DE 10 2015 009 143.3, filed on Jul. 13, 2015.

FIELD OF THE INVENTION

The present invention relates to a freewheel hub for a bicycle, comprising a hub axle, a hub sleeve which is mounted rotatably on the hub axle via a bearing arrangement, a driver which is mounted rotatably on the hub axle and is connectable to at least one sprocket arrangement, and a freewheel device which is arranged between the hub sleeve and the driver and optionally allows relative rotation between the hub sleeve and the driver or couples the hub sleeve and the driver in a torque-transmitting manner. The freewheel device has at least one first clutch ring and at least one second clutch ring, wherein the first clutch ring is coupled or coupleable to the hub sleeve in a torque-transmitting manner, and wherein the second clutch ring is coupleable or coupled to the driver in a torque-transmitting manner. The two clutch rings have mutually facing tooth sets, wherein the first and the second clutch ring are displaceable axially relative to the hub axle between an engaged position, in which the tooth sets are engaged with one another in a torque-transmitting manner, and a released position, in which the tooth sets are not engaged with one another.

BACKGROUND

Such freewheel hubs are known from the prior art. Thus, for example the document DE 198 47 673 A1 shows a freewheel hub in which the two clutch rings are biased towards one another in each case via a spring assigned thereto.

The document DE 10 2012 016 945 A1 discloses a hub which has a hub body and a drive device. A cogset can be attached to the drive device. A ratchet freewheel between the drive device and the hub body allows a freewheel function. The ratchet freewheel has two engagement components which are embodied as star ratchets. The star ratchets have axial tooth sets which can be brought into engagement with one another. A magnet device is inserted in each case into a receiving space in the star ratchets. In this case, the magnet devices are arranged such that the south pole of one magnet device is arranged adjacent to the north pole of the in each case other magnet device. The magnet devices form a traction device which ensures that the two star ratchets are pretensioned into their engaged position.

A freewheel hub having magnet devices is also known from the document DE 10 2012 016 949 A1.

Furthermore, the document DE 10 2012 020 472 A1 discloses a freewheel hub in which the two clutch rings, as seen in a section containing the axis, have a stepped wall thickness profile with a portion of greater wall thickness and a portion of reduced wall thickness. A tooth set is formed in a central radial region of the clutch rings, in each case in the portion of greater wall thickness. In one of the two clutch rings, the portion of reduced wall thickness is formed radially inside the tooth set, adjoining the latter. In the other of the two clutch rings, the portion of reduced wall thickness can be formed radially outside the tooth set, adjoining the latter.

The above-described freewheel hub has proven to be highly successful in practice. However, it has been found that the known freewheel hubs tend, in particular in road bicycle racing, to produce or emit a relatively large amount of noise. The reason for this is that wheels, for example high-profile carbon rims, are becoming increasingly rigid and lightweight and can thus transmit and amplify vibrations and oscillations that arise in the freewheel hub all the better. In particular in combination with a high-profile carbon rim, a wheel forms an optimum acoustic body which can transmit and amplify the oscillations and thus noises that arise in the freewheel hub.

It is therefore an object of the present invention to provide a freewheel hub with which the noise production of the freewheel hub and of the freewheel hub in combination with the wheel can be reduced. It is a further object of the present invention to provide a freewheel hub in which the dead angle of the freewheel is relatively small and the freewheel torque at high speeds is as low as possible.

SUMMARY AND DESCRIPTION

In the freewheel hub according to the invention, at least one magnet arrangement accommodated in apertures in the first clutch ring or the second clutch ring keeps the clutch rings in their engaged position, i.e. the tooth sets of the clutch rings are engaged with one another in a torque-transmitting manner. The apertures for accommodating the magnet arrangement are in this case arranged and configured such that, in the event of relative rotation between the first and second clutch rings, the clutch rings are transferable from the engaged position into the freewheel position and back again.

Unlike in the prior art, in the case of the freewheel hub according to the invention, use is not made of magnet arrangements arranged with opposing poles, which bias the star ratchets towards one another. The magnet arrangements arranged with opposing poles contribute significantly to the production of noise or the occurrence of oscillations and vibrations in the freewheel hub. In the freewheel hub according to the invention, a magnet arrangement is provided in apertures in the first clutch ring, with the result that the noise production or the occurrence of oscillations and vibrations can be reduced considerably.

In the engaged position, a torque transmitted to the freewheel hub via a driver is transmitted to the hub sleeve via the clutch rings that are engaged in a torque-transmitting manner. No relative rotation or relative movement takes place between the first clutch ring and the second clutch ring in the engaged position. In order to transfer the first clutch ring and the second clutch ring into the freewheel position and back again, both a relative rotation and a relative movement take place in the axial direction between the clutch rings. By way of the apertures and the magnet arrangement accommodated therein, in the event of relative rotation between the first clutch ring and the second clutch ring, the first clutch ring and the second clutch ring can be transferred quickly and reliably into the freewheel position or back into the engaged position. The reason for this is that, as a result of the apertures and the magnet arrangement arranged in the apertures, in the event of relative rotation between the first clutch ring and the second clutch ring, the action of the magnetic force of the magnets accommodated in the first clutch ring on the second clutch ring changes. The attractive force of the magnets in the apertures of the first clutch ring acts most strongly on the second clutch ring when the second clutch ring takes up predetermined angular positions relative to the magnets of the first clutch ring. If the second clutch ring is not in one of the predetermined angular positions relative to the first clutch ring, the attractive force of the magnets acts less strongly on the second clutch ring. In other words, the magnetic force changes depending on the angular positions of the first clutch ring and of the second clutch ring relative to one another. This changeable or varying magnetic force allows quick and reliably transfer of the clutch rings into the freewheel position and out of the freewheel position back into the engaged position, in which the two clutch rings are engaged in a torque-transmitting manner and a torque can be transmitted to the hub sleeve.

According to one embodiment of the invention, the apertures in the first clutch ring may be configured and arranged such that a tooth of the second clutch ring completely covers a surface portion, exposed by the aperture, of the magnet accommodated in the aperture in the engaged position. The greater the degree of overlap between a tooth of the second clutch ring and the exposed portion of the magnet accommodated in the first clutch ring, the more strongly the attractive force of the magnets in the first clutch ring acts on the tooth of the second clutch ring. This also applies independently of the engaged position, i.e. this also applies when the clutch rings are separated from one another in the axial direction. If the first clutch ring and the second clutch ring are still in a separated state in an axial direction of the hub axle, the attractive force of the magnet is also at its greatest when a tooth of the second clutch ring largely or virtually completely overlaps the portion, exposed by the aperture, of the magnet. As a result, it is possible to ensure that the clutch rings can be displaced quickly and reliably out of the freewheel position and back into the engaged position.

The apertures in the first clutch ring may be configured at least in sections between two adjacent teeth of the axial tooth set of the first clutch ring. The magnet accommodated in the particular aperture may span the region between two adjacent teeth, said region corresponding substantially to a tooth of the second clutch ring in the engaged position, i.e. this space or this region is occupied by a tooth of the second clutch ring in the engaged position. The apertures may be configured with stop surfaces against which the magnets can bear with one of their axial end faces. In the case of bar magnets or cylindrical magnets, the field lines of the magnetic field emerge from the axial end faces.

The magnet arrangement accommodated in the first clutch ring may comprise a plurality of magnets. The magnets may be bar magnets or cylindrical magnets. The shape of the apertures in the first clutch ring can match the shape or form of the magnets. The surface portion, exposed by the aperture, of the magnet accommodated in the first aperture may correspond in terms of area substantially to a sliding surface of a tooth of the second clutch ring.

According to one embodiment, at least one guide sleeve may be provided on the hub sleeve. The at least one guide sleeve may serve to guide the first and/or the second clutch ring in the direction of the hub sleeve. At high speeds, oscillations and vibrations can be transmitted to the hub sleeve by the clutch rings. With the at least one guide sleeve, direct contact of the first clutch ring and/or of the second clutch ring with the hub sleeve can be prevented in the freewheel position, such that no oscillations and vibrations can be transmitted to the hub sleeve by the first clutch ring and/or the second clutch ring in the freewheel mode. The at least one guide sleeve can prevent contact of the first clutch ring with the hub sleeve in the radial and/or axial direction in the freewheel mode of the freewheel hub. The at least one guide sleeve can thus decouple the freewheel device from the hub sleeve acoustically and in terms of vibration. The at least one guide sleeve may be produced from a material which is usually used for plain bearings. This may be in particular plastics material. The at least one guide sleeve comprises a guide portion for guiding the first clutch ring and/or the second clutch ring. Furthermore, the at least one guide sleeve may comprise a fastening portion by way of which the at least one guide sleeve can be attached to the hub sleeve.

At least one magnet may be accommodated in the at least one guide sleeve. The at least one magnet in the at least one guide sleeve can interact with the magnet arrangement in the at least one first clutch ring in order to keep the clutch rings in the engaged position. Furthermore, the at least one magnet accommodated in the at least one guide sleeve can interact with the magnet arrangement in the first clutch ring in order to displace the clutch rings between the freewheel position and the engaged position.

At least the first clutch ring may have a recess for accommodating the at least one guide sleeve. At least the first clutch ring may be displaceable in the axial direction on the guide sleeve by way of the at least one recess. The guide sleeve may be embodied with at least one shoulder or at least one abutment surface. The first clutch ring may bear against the abutment surface or the shoulder in the freewheel position.

The at least one guide sleeve may be mounted resiliently or elastically on the hub sleeve. In other words, the at least one guide sleeve may be accommodated in a vibration-damping manner in at least one receptacle in the hub sleeve. In particular the fastening portion of the at least one hub sleeve may be accommodated in the receptacle in the hub sleeve. The at least one guide sleeve may be attached to the hub sleeve in a vibration-damping manner via at least one elastic element. For example, the elastic element may be produced from an elastomer. The at least one elastic element may be configured in an annular manner.

According to one embodiment of the invention, the at least one guide sleeve may be configured such that the at least one guide sleeve sets a predetermined air gap between the magnet accommodated therein and the clutch rings. As a result, the magnetic force of the magnets accommodated in the guide sleeves can be set such that clutch rings can be displaced back into the engaged position quickly, and nevertheless rapid separation of the clutch rings during the transition into the freewheel position is likewise possible.

The at least one recess in the first clutch ring for accommodating the at least one guide sleeve may be configured and arranged such that the at least one recess is covered at least in sections by a tooth of the second clutch ring in the engaged position. The at least one recess in the clutch ring for accommodating the at least one guide sleeve, and one aperture of the apertures for accommodating the magnet arrangement in the first clutch ring may be arranged alternately in the circumferential direction of the first clutch ring and of the second clutch ring and be arranged in a manner offset by a predetermined angle with respect to one another. The at least one guide sleeve may be configured and arranged on the hub sleeve such that a predetermined clearance or a predetermined air gap between a radial tooth set of the hub sleeve and a radial tooth set at least of the first clutch ring is adjustable with the at least one guide sleeve. As a result, it is possible for an air gap, which provides decoupling in terms of vibration, to be maintained only between these tooth sets in the freewheel mode. With this air gap, it is possible to prevent the oscillations and vibrations that arise when the sliding surfaces of the clutch rings meet one another from being transmitted to the hub sleeve.

The individual teeth of the radial tooth sets of the hub sleeve and of the first clutch ring have load-bearing flanks and non-load-bearing flanks. The load-bearing flanks serve to transmit torque between the first clutch ring and the hub sleeve. Via the guidance of the first clutch ring by means of the at least one guide sleeve, a predetermined clearance or a predetermined air gap between the radial tooth sets of the hub sleeve and of the first clutch ring may be set such that the air gap or the clearance between the load-bearing flanks of the teeth of the radial tooth sets is small and at the same time the clearance or the air gap between the non-load-bearing flanks of the radial tooth sets is relatively large. In the engaged position of the clutch rings, i.e. when torque is intended to be transmitted to the hub sleeve, it is thus possible for the force transmission to take place via the load-bearing flanks in an unimpeded manner, with exploitation of the between the at least one guide sleeve and of the first clutch ring. In the freewheel position, the freewheel torque acting on the first clutch ring can be absorbed entirely by the at least one guide sleeve, since direct contact does not take place between the radial tooth sets of the hub sleeve and of the first clutch ring. Since the at least one guide sleeve can prevent contact between the radial tooth sets of the hub sleeve and of the first clutch ring effectively in the freewheel mode, it is also possible for oscillations and vibrations that occur in the radial direction and/or in the circumferential direction not to be transmitted to the hub sleeve by the freewheel device.

The at least one guide sleeve may accordingly decouple the hub sleeve from the freewheel device in terms of vibration. In summary, force transmission can take place between the teeth of the radial tooth sets of the hub sleeve and of the first clutch ring in the drive direction, i.e. the teeth bear against one another. If the teeth consist for example of metal, the force transmission thus takes place by metal on metal. In contrast, an air gap is always set between the radial tooth sets of the hub sleeve and of the first clutch ring via the at least one guide sleeve in the freewheel mode, such that it is possible to prevent transmission of oscillations and vibrations to the hub sleeve.

The magnets, accommodated in the apertures of the first clutch ring, of the magnet arrangement may have the same orientation with regard to their north and south poles. The at least one magnet accommodated in the at least one guide sleeve may have the same orientation with regard to its north and south pole as the magnets accommodated in the first clutch ring. All of the magnets can thus be arranged with identical poles.

According to one embodiment, the attractive force provided by the at least one magnet arrangement may vary depending on the angular positions of the first clutch ring and of the second clutch ring relative to one another. Furthermore, the attractive force provided by the at least one magnet in the at least one guide sleeve may vary depending on the angular positions of the first clutch ring and of the second clutch ring relative to one another.

Thus, high magnetic attractive forces of the at least one magnet arrangement and/or of the at least one magnet in the guide sleeve can be ensured depending on predetermined angular positions, which keep the clutch rings against one another. Since the attractive forces change depending on the angular positions of the clutch rings, a quick separation of the clutch rings at the transition into the freewheel position can be achieved for example by a large drop in the attractive forces of the magnets with changing angular positions of the clutch rings.

In the freewheel position, too, high attractive forces can act on the second clutch ring depending on the angular positions of the clutch rings relative to one another, wherein the attractive forces are somewhat lower than in the engaged position on account of the axial spacing between the clutch rings in the freewheel position. As a result of these relatively large attractive forces in predetermined angular positions, it is possible for the clutch rings to be able to be transferred quickly from the freewheel position back into the engaged position, in which they are engaged with one another in a torque-transmitting manner.

The first clutch ring and the second clutch ring may be configured such that, in at least one predetermined angular position of the first clutch ring relative to the second clutch ring, only the attractive force of the at least one magnet arrangement acts on the second clutch ring. The first clutch ring and the second clutch ring may furthermore also be configured such that, in at least one predetermined angular position of the first clutch ring relative to the second clutch ring, the attractive forces of the at least one magnet arrangement and of the at least one magnet in the at least one guide sleeve jointly act on the second clutch ring.

According to one embodiment, the first clutch ring and the second clutch ring may be able to be decoupleable from the hub sleeve in terms of vibration at least in the axial direction via a decoupling element. The freewheel device may be decoupled from the hub sleeve in terms of vibration via at least one decoupling device. The decoupling device provides decoupling of the freewheel device from the hub sleeve in the axial, radial and circumferential directions. The decoupling in the radial direction and circumferential direction relates to the case in which the freewheel device is in the freewheel mode, in which no torque is transmitted.

The at least one decoupling device ensures that vibrations and oscillations that arise in the freewheel device cannot be transmitted to the hub sleeve. This prevents noise from being produced by the oscillations and vibrations that arise in the freewheel device and can disturb the rider of the bicycle and his environment. The at least one decoupling device also prevents the clutch rings of the freewheel device from being able to strike the hub sleeve in the radial, axial, and circumferential directions when in the freewheel mode. This likewise contributes considerably to reducing noise production.

The at least one decoupling device may have at least one decoupling element. The at least one decoupling element can prevent the first clutch ring and/or the second clutch ring from striking the hub sleeve axially. By way of the at least one decoupling element, the production of the freewheel hub can furthermore be simplified and the production costs can also be reduced. By way of the at least one decoupling element, the tolerance chain between hub sleeve, first clutch ring and second clutch ring can be reduced, i.e. said components can be produced with a wider tolerance band, thereby reducing the production effort and also the production costs.

The at least one decoupling element may be a decoupling ring. By way of the at least one decoupling element, or by way of the at least one decoupling ring, the hub sleeve is thus decoupled from oscillations or impacts in the axial direction by the freewheel device formed by the first clutch ring and the second clutch ring. As a result, oscillations and impacts are prevented from being transmitted to the wheel or the rim by the hub sleeve, with the result that noise production by the freewheel hub or the combination of freewheel hub and wheel can be considerably reduced. The at least one decoupling element may be produced from a damping material. As a result, the freewheel device formed by the first clutch ring and the second clutch ring is decoupled from the hub sleeve. The at least one decoupling element can be produced from a plastics material or an elastomer.

According to one embodiment, the at least one decoupling ring, the first clutch ring and the second clutch ring can form a separate assembly. This assembly can slide on the hub sleeve with its inner circumference. The at least one decoupling ring and the second clutch ring may be connected together such that a relative movement in the axial direction between the first clutch ring and the at least one decoupling ring connected to the second clutch ring is possible. The first clutch ring can be mounted so as to be rotatable and displaceable in the axial direction with its inner circumferential surface on the unit formed by the second clutch ring and the at least one decoupling ring. Furthermore, the unit formed by the second clutch ring and the at least one decoupling ring can be mounted so as to be rotatable and displaceable in the axial direction on the outer circumferential surface of the hub sleeve. The unit formed by the second clutch ring and the at least one decoupling ring can limit the relative movement of the first clutch ring in the axial direction. To this end, the at least one decoupling ring can have a protrusion that protrudes in the radial direction. In addition to the protrusion of the at least one decoupling ring, the second clutch ring can also limit a relative movement of the first clutch ring in the axial direction.

The at least one decoupling device may have at least one guide sleeve. The at least one guide sleeve may be provided on the hub sleeve. The at least one guide sleeve may serve to guide the first and/or the second clutch ring in the direction of the hub sleeve.

The at least one guide sleeve may have at least one stop for the first clutch ring. The first clutch ring can bear against the at least one stop. The first clutch ring can bear against the at least one stop on the at least one guide sleeve depending on the angular position of the first clutch ring relative to the second clutch ring. This can take place in particular when the clutch rings are transferred into the released position from the engaged position.

The at least one guide sleeve may have at least one abutment surface for the abutment of the at least one decoupling element. The at least one decoupling element can bear against the at least one abutment surface of the guide sleeve and, depending on the angular position of the first clutch ring relative to the second clutch ring, be lifted from the at least one abutment surface on the at least one guide sleeve. The at least one abutment surface can extend perpendicularly to the axis of the freewheel hub.

The two preceding paragraphs apply to all of the above-described embodiments, which can thus have guide sleeves configured in such a way. Furthermore, at least one sound-reducing material can be provided in the space formed in the hub sleeve to accommodate the freewheel device. The sound-reducing material can be used as an alternative to the above-described decoupling measures and also with conventional freewheel hubs.

The sound-reducing elements can be sound-absorbing elements or sound-deadening elements. In the case of sound absorption, the sound energy is reduced by conversion into heat. In the case of sound deadening, the sound intensity may be reduced in that the sound energy is distributed for example over a larger area. The sound-reducing elements accordingly serve to reduce disturbing noise in the bicycle hub. The sound-reducing elements can be produced from porous materials. Suitable materials may be microcellular polymers, polyurethanes and other plastics materials foamed to form a porous product. Natural porous materials, for example cork, can also be used as sound-reducing components. As a result of the degree of absorption or deadening of the porous or cellular materials, it is possible to dispense with further sound-deadening measures in the freewheel hub. As a result, it is possible to dispense for example with contact seals, which increase the friction between the individual components of the freewheel hub.

The sound-reducing material can cover at least one wall portion of the space formed in the hub sleeve to accommodate the freewheel device. Exemplary embodiments are described in the following text with reference to the accompanying figures.

BRIEF DESCRIPTION OF THE DRAWINGS

FIG. 6 shows a partially broken-open perspective view of the freewheel hub according to the first embodiment;

FIG. 7 shows an enlarged view of the detail VII in FIG. 6;

FIGS. 10 to 12 show sectional views of different positions of the freewheel device of the freewheel hub according to the first embodiment during the transition from the engaged position into the released position;

FIG. 19 shows a diagram of the profile of the attractive force.

DETAILED DESCRIPTION OF THE DRAWINGS

Figure 1:
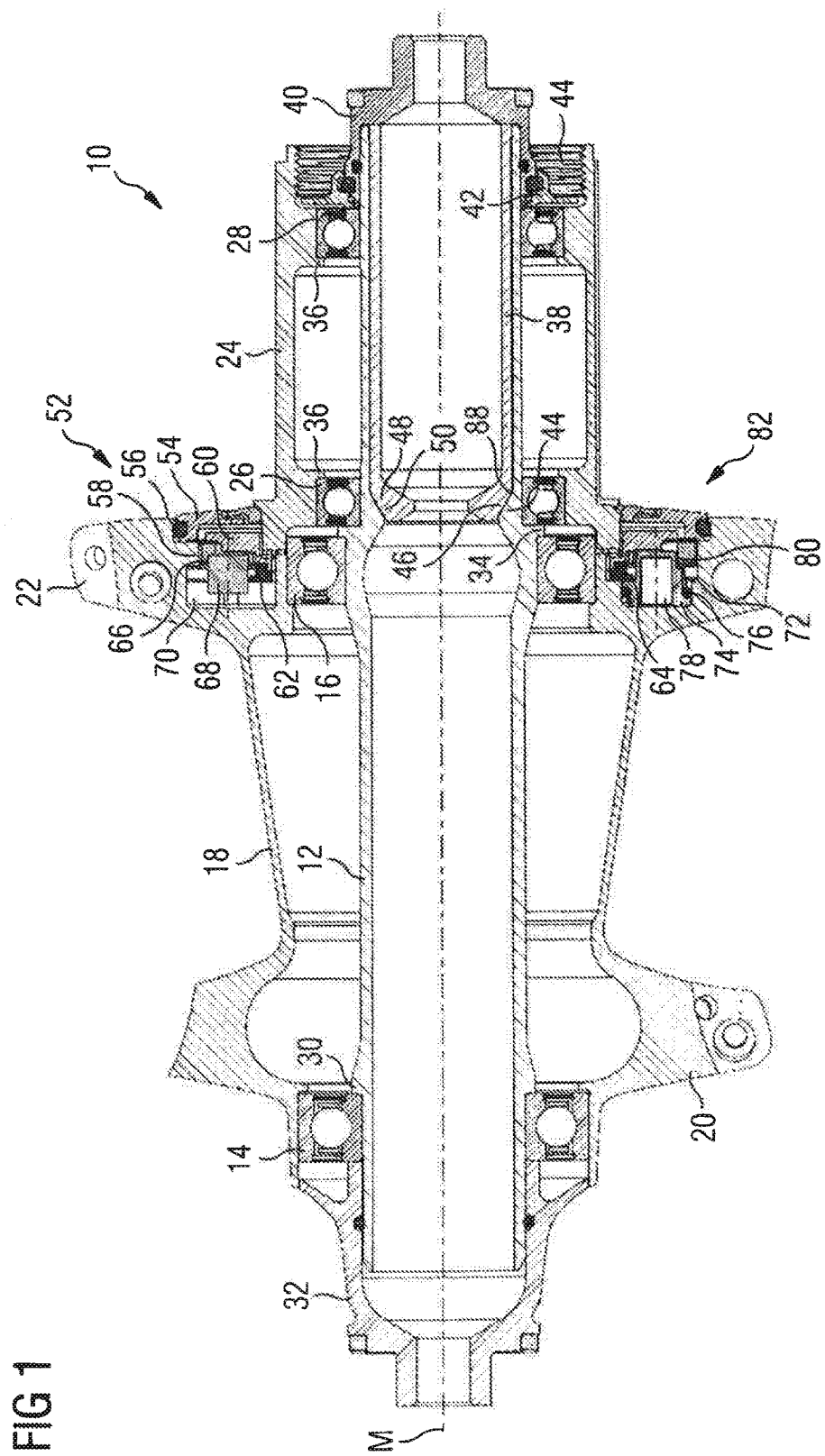
FIG. 1 shows a sectional view, containing the axis, of a freewheel hub according to a first embodiment.

FIG. 1 shows a sectional view, containing the axis, of the freewheel hub according to a first embodiment, wherein the freewheel hub bears the overall designation 10. The longitudinal axis of the freewheel hub 10 bears the overall designation M. The freewheel hub 10 comprises a hub axle 12 into which an axle (not shown) is pluggable by way of quick-action clamping mechanisms via which the hub axle 12 is able to be fixed to a bicycle frame.

A hub sleeve 18 is mounted rotatably on the hub axle 12 via the two rolling bearings 14, 16. The hub sleeve 18 has two spoke flanges 20, 22, to which spokes are attachable in a manner known per se. Furthermore, a driver 24 or a driver sleeve 24 is rotatably mounted on the hub axle 12 via rolling bearings 26 and 28.

The bearing 14 is supported on a protrusion 30 formed on the hub axle 12. The bearing 14 is pressed against the protrusion 30 via a closure element 32 which is plugged onto the hub axle 12. A further protrusion or a step 34 is formed on the axle 12. One of the bearings 16 and 26 is supported on each axial side of this step 34. Radially inward protruding protrusions 36, which serve to support or position the bearings 26 and 28 on the hub axle 12, are provided on the driver sleeve 24. Accommodated in the hub axle 12 is a fastening element 38 which is displaceable in the direction of the axis M and which serves in particular to fix the bearing 26 in its predetermined position via a press fit. The fastening element 38 and the hub axle 12 will be dealt with in more detail again with reference to FIG. 2. The driver sleeve 24 is secured to the hub axle 12 with the bearings 26 and 28 via closure elements 40, 42. To this end, the closure element 40 is plugged onto the hub axle 12 and is clamped with a quick-release clamp. A portion 44 having an internal thread is discernible on the driver sleeve 24, said portion serving to fasten a sprocket arrangement (not shown in FIG. 1) to the hub sleeve 24.

If the closure element 40 is plugged onto the hub axle 12, the fastening element 38 is displaced along the axis M to a radially inward protruding protrusion 46 on the hub axle 12 and is pressed against this protrusion. The protrusion 44 has an abutment surface 46 that extends in an inclined or oblique manner to the axis M and points substantially towards the closure element 40. The fastening element 38 has an end portion 48 which narrows or constricts the diameter of the fastening element 38. The end portion 48 is thus configured in a conical manner. Provided on this end portion 48 is an inclined abutment surface 50, which can be brought into contact with the abutment surface 46 on the protrusion 40 of the hub axle 12. The abutment surface 46 of the protrusion 44 forms a counterpart abutment surface for the abutment surface 50 of the fastening element 38. The fastening element 38 is clamped against the protrusion 44 or the abutment surface 46 when the closure element 40 is screwed together with the hub sleeve 12. The fastening element 38 can thus convert a force exerted axially on the fastening element 38 into a radial enlargement of the cross section of the hub axle 12. As a result, depending on the inclination angles of the abutment surfaces 46 and 50, the cross section of the hub axle 12 is enlarged or widened in sections or at points in the radial direction. As a result of this widening, the outside diameter of the hub axle 12 is increased. The increase in the diameter or outside diameter of the hub axle 12 has the result that a press fit is established between the bearing 26 and the outer circumference of the hub axle 12. As a result, the bearing 26 is fixed in its predetermined position on the hub axle 12 in the radial direction. The bearing 26 cannot loosen as a result of the established press fit and the spacing between the bearings 26 and 28 can be fixed permanently without specific measures having to be taken to maintain the spacing during assembly. In particular, it is possible to dispense with the spacer sleeves, known from the prior art, between the bearings 26 and 28. As a result of the permanent fixing of the spacing between the bearing 26 and the bearing 28 on the hub axle, bearing damage and wear phenomena on the axle and on the bearings are avoided.

The freewheel device 52 is discernible between the driver sleeve 24 and the hub sleeve 18. The freewheel device 52 is closed off from the environment via closure elements 54 which extend between the hub sleeve 18 and the driver sleeve 24, and is also sealed off via a sealing ring 56. The freewheel device 52 is accommodated in the hub sleeve 18. The freewheel device 52 comprises a first clutch ring 58 and a second clutch ring 60. The second clutch ring 60 is connected to a decoupling ring 62. The connection between the decoupling ring 62 and the second clutch ring 60 can be established for example via a latching connection or a snap-action connection. The decoupling ring 62 can be produced from plastics material. The decoupling ring 62 is intended to prevent the clutch rings 58 and 60 from striking the hub sleeve in the axial direction. This striking of the hub sleeve 18 can result in undesired oscillations and the production of noise. The decoupling ring 62 thus decouples the clutch rings 58 and 60 from the hub sleeve 18 in terms of vibration or acoustically in the axial direction. The first clutch ring 58 can be moved in a relative manner both in the axial direction and in the circumferential direction with its inner circumference on the second clutch ring 60 and the decoupling ring 62. In other words, the first clutch ring 58 can slide with its inner circumference on the decoupling ring 62 and the second clutch ring 60. The decoupling ring 62 has a radially outward protruding protrusion 64, via which the first clutch ring 58 is held on the decoupling ring 62 and the second clutch ring 60.

The first clutch ring 58, the second clutch ring 60 and the decoupling ring 62 form a separate assembly, which is arranged in a movable manner on the hub sleeve 18. The second clutch ring 60 connected to the decoupling ring 62 can move together with the decoupling ring 62 in the axial direction relative to the first clutch ring 58. As already mentioned above, the first clutch ring 58 can also move relative to the second clutch ring 60 and the decoupling ring 62.

The first clutch ring 58 has apertures 66 which are profiled in a stepped manner and into which magnets 68 are inserted and held via the stepped profiling. The magnets 68 can be configured as cylindrical or bar magnets. The form of the apertures 66 matches the shape of the magnets 68. The magnets 68 extend in sections in a recess 70 in the hub sleeve 18. Accommodated in a further recess 72 in the hub sleeve 18 are guide sleeves 74 which are mounted elastically in the recess 72 in the hub sleeve 18 via an elastic element 76. The guide sleeves 74 can be produced from a material which is usually used for plain bearings. Magnets 78 are accommodated in the guide sleeves 74. The magnets 78 can likewise be configured as cylindrical or bar magnets. The first clutch ring 58 has a recess 80 for receiving the guide sleeves 74 in sections. The first clutch ring 58 is mounted on the guide sleeves 74 so as to be displaceable in the axial direction. The guidance via the guide sleeves 74 and the connection between the first clutch ring 58 and the hub sleeve 18 via the guide sleeves 74 ensures acoustic decoupling between the freewheel device 52 and the hub sleeve 18 in the axial and radial direction, since a predetermined spacing can be set in the radial direction between the hub sleeve 18 and the first clutch ring 58 via the guide sleeves 74.

The guide sleeves 74 and the decoupling ring 62 together form a decoupling device 82 which decouples the freewheel device 52 from the hub sleeve 18 in terms of vibration. The guide sleeve 74 and the decoupling ring 62 prevent the clutch rings 58 and 60 of the freewheel device 52 from striking the hub sleeve 18 in the axial direction. In the freewheel mode of the freewheel hub 10, in particular the guide sleeve 74 prevents the first clutch ring 58 from striking the hub sleeve 18 in the radial direction and in the circumferential direction.

Figure 2:
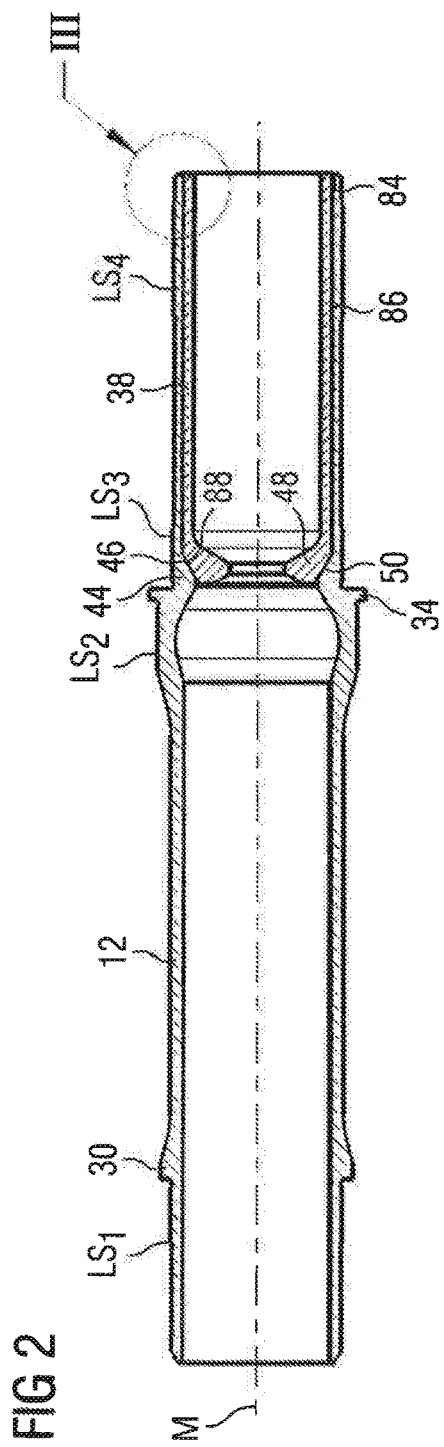
FIG. 2 shows a sectional view of the hub axle of the freewheel hub according to FIG. 1.

FIG. 2 shows a sectional view of the hub axle 12 with the fastening element 38. The radially outward projecting protrusions 30 and 34, which serve for abutment of the bearings 14, 16, 26 of the freewheel hub 10 (see FIG. 1), are discernible on the hub axle 12. A bearing seat $LS_1$ for fastening the bearing 14 (see FIG. 1) is discernible to the left of the protrusion 30 in the axial direction. Bearing seats $LS_2$ and $LS_3$, which serve to fasten the bearings 16 and 26, are likewise discernible to the left and right of the protrusion, or of the step 34, in the axial direction. A further bearing seat $LS_4$ is discernible to the left of a press-fit portion 84 in the axial direction. In the region of the bearing seats $LS_1$ to $LS_4$, the hub axle 12 has a slightly enlarged outside diameter compared with the remaining portions thereof.

The fastening element 38 is accommodated in the hub axle 12 so as to be displaceable in the direction of the axis M. The fastening element 38 has a tubular portion 86 which extends along the inner circumferential surface of the hub axle 12. Formed at the transition from the tubular portion 86 to the end portion 48 is an edge 88 which, together with the abutment surface 50 of the fastening element 48, widens the cross section of the hub axle 12 in the region of the abutment surface 46 on the protrusion 44 of the hub axle 12. The fastening element 38 bears, with its abutment surface 50 extending in an inclined manner with respect to the axis M, against the abutment surface 46, extending in an inclined manner with respect to the axis M, of the radially inward projecting protrusion 44 on the hub axle 12. The end portion 48 is configured in a conical manner. Compared with the remaining wall thickness of the fastening element 38 in the tubular portion 86, the end portion 48 has an increased wall thickness. This increased wall thickness and the associated greater rigidity of the end portion 48 ensures that, via the end portion 48, the outer circumference of the hub sleeve 18 can be increased in the region of the bearing seat $LS_3$. If a force that acts in the axial direction is exerted on the fastening element 38 via the closure element 40, the fastening element 38 is pressed with its abutment surface 50 against the counterpart abutment surface 46 of the protrusion 44. On account of the axial force, the fastening element 38 travels with its conical end portion 48 or the abutment surface 50 in the axial direction along the counterpart abutment surface 46. As soon as the edge 88 of the fastening element 38 reaches the region of the counterpart abutment surface 46, the cross section of the hub axle 12 is widened in the radial direction in the region of the bearing seat $LS_3$. As a result, a press fit is created between the hub axle 12 and the inner ring of the bearing 26.

Figure 3:
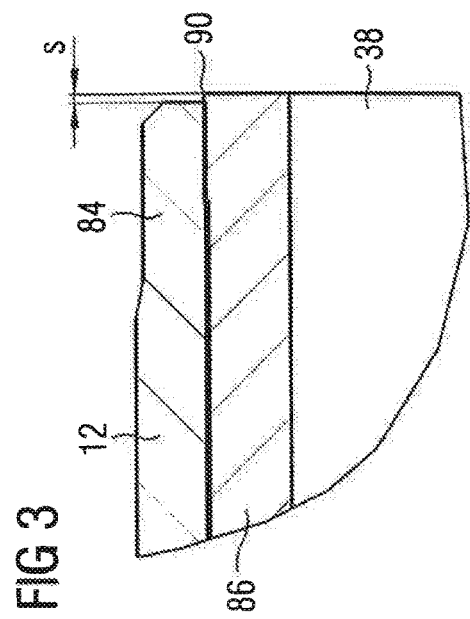
FIG. 3 shows an enlarged detail view of the detail III in FIG. 2.

FIG. 3 shows an enlarged view of the detail III in FIG. 2. It is clear from FIG. 3 that a portion 90 of the fastening element 38 protrudes in the unloaded state from the hub axle 12 by a predetermined distance s in the axial direction. This is necessary in order that an axial force can be exerted on the fastening element 38 via the closure element 40 (see FIG. 1), the fastening element 38 being pushed in the axial direction against the protrusion 44 on the inner circumferential surface of the hub axle 12 by said axial force. The force exerted on the fastening element 38 via the closure element 40 is transmitted to the abutment surface 46 of the protrusion 44 via the end portion 48 of the fastening element 38 with its counterpart abutment surface 50, and is converted into a radial widening of the circumference of the hub axle 12 in the region of the bearing seat $LS_3$.

Figure 4:
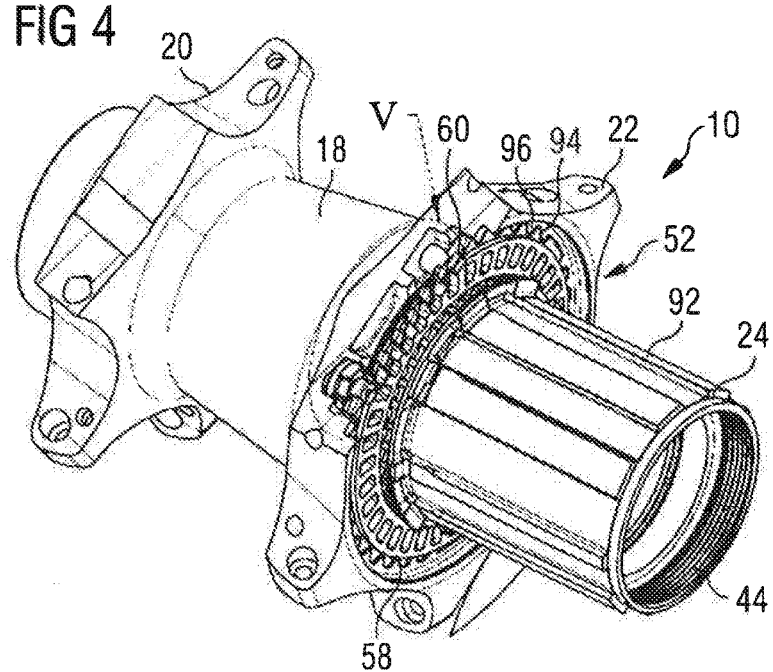
FIG. 4 shows a partially broken-open perspective view of a clutch device according to the first embodiment.

FIG. 4 shows a partially broken-open view of the freewheel hub 10. The hub sleeve 18 has the spoke flanges 20 and 22. Shown between the hub sleeve 18 and the driver sleeve 24 is the freewheel device 52, which is provided in the region of the spoke flange 22 in the hub sleeve 18.

Radially outward protruding protrusions 92, which allow a sprocket arrangement (not shown) to be slid on in the axial direction, are discernible on the driver sleeve 24. Furthermore, the internal thread portion 44, which is intended for fastening a sprocket arrangement (not shown), is discernible in FIG. 4.

The first clutch ring 58 and the second clutch ring 60 are likewise discernible in FIG. 4. A radial external tooth set 94 is provided on the first clutch ring 58 and the hub sleeve 18 has a corresponding radial internal tooth set 96.

Figure 5:
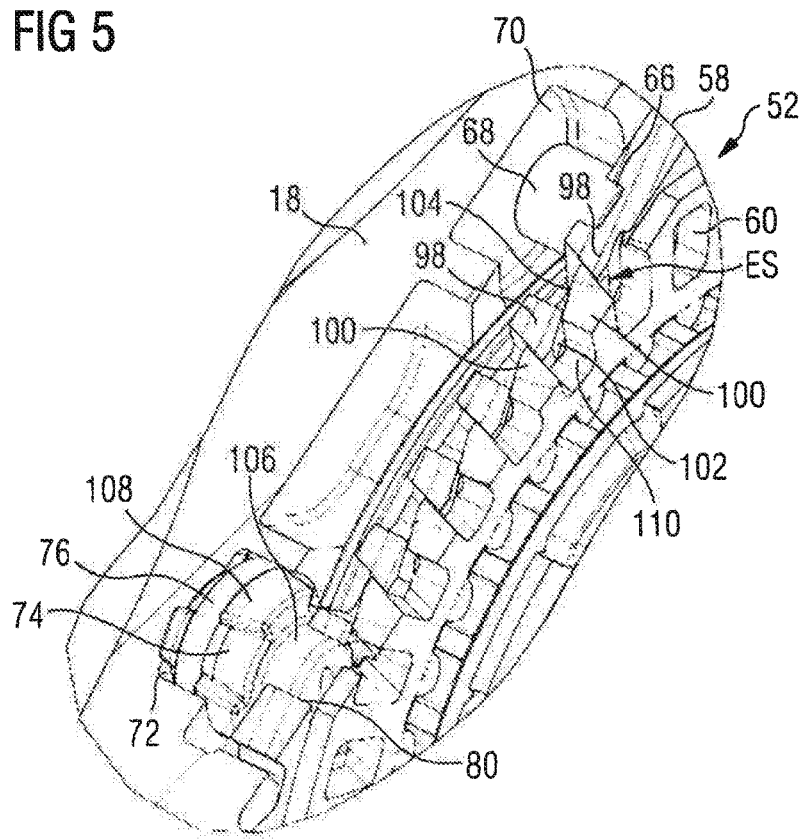
FIG. 5 shows an enlarged view of the detail V in FIG. 4.

FIG. 5 shows an enlarged view of the detail V in FIG. 4. The freewheel device 52 is discernible in FIG. 5. The freewheel device 52 comprises the first clutch ring 58 and the second clutch ring 60. Both the first clutch ring 58 and the second clutch ring 60 have axial tooth sets directed towards one another. The axial tooth set of the first clutch ring 58 has the axial teeth 98. The axial tooth set of the second clutch ring 60 has the axial teeth 100. The teeth 98 and 100 each have sliding surfaces 102 and 104 on which the teeth 98 and 100 can slide against one another as soon as a relative rotation takes place between the first clutch ring 58 and the second clutch ring 60. According to FIG. 5, the freewheel device 52 is in its engaged position, i.e. the first clutch ring 58 and the second clutch ring 60 are engaged with one another in a torque-transmitting manner. This is discernible in particular at the locations indicated by the arrow ES, which show the teeth 98 of the first clutch ring 58 engaged with the teeth 100 of the second clutch ring 60.

The first clutch ring 58 has apertures 66 for receiving magnets 68. The magnets 68 extend in sections in a recess 70 in the hub sleeve 18.

The first clutch ring 58 furthermore has a further recess 80 for receiving a guide portion 106 of the guide sleeve 74. The fastening portion 108 of the guide sleeve 74 adjoins the guide portion 106. The fastening portion 108 is received elastically in the recess 72 in the hub sleeve 18 via an elastic element 76. The elastic element 76 can be configured for example in an annular manner.

The second clutch ring 60 furthermore has recesses 110 which are provided on the clutch ring 60 in a manner distributed in the circumferential direction.

FIG. 6 again shows a partially broken-open perspective view of the clutch device 10, which corresponds substantially to the above-described FIG. 4. The essential differences between FIG. 4 and FIG. 6 can be seen in the detail VII. The detail VII is dealt with in detail in the following text with reference to FIG. 7.

FIG. 7 shows an enlarged view of the detail VII in FIG. 6. The essential difference between the detail VII shown in FIG. 7 and the detail V shown in FIG. 5 is that relative rotation has taken place between the first clutch ring 58 and the second clutch ring 60. As a result of this relative rotation, the first clutch ring 58 and the second clutch ring 60 were separated and, according to FIG. 7, are now in the freewheel position, as can be seen in particular at the locations indicated by the arrows FS.

The teeth 98 of the first clutch ring 58 and the teeth 100 of the second clutch ring 60 are no longer engaged with one another, such that the freewheel hub is in the freewheel mode, in which relative rotation between the hub sleeve 18, with the wheel attached thereto, and the driver sleeve 24 can take place. In the freewheel mode, the hub sleeve 18 with the wheel attached thereto usually rotates more quickly than the driver sleeve 24.

Figure 8:
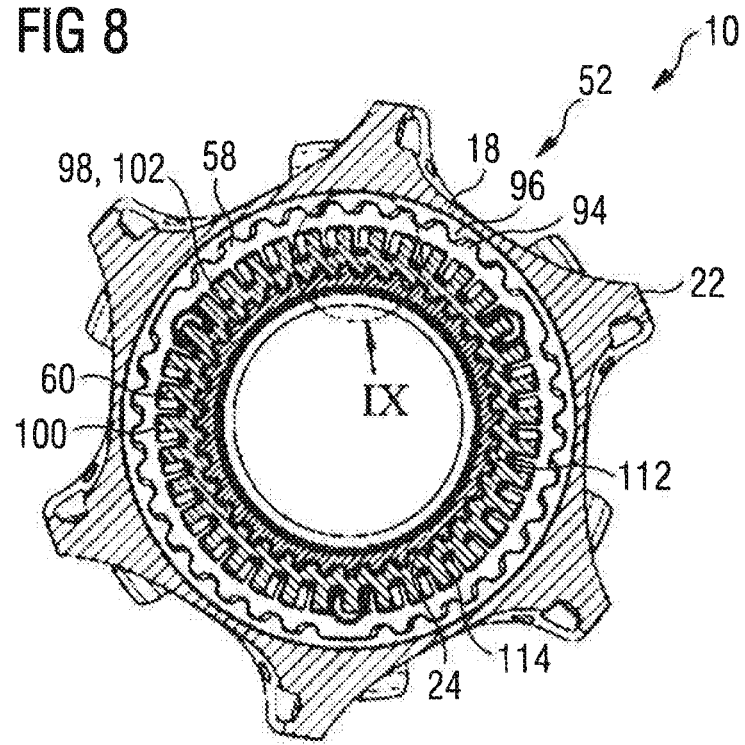
FIG. 8 shows a sectional view of the freewheel hub according to the first embodiment.

FIG. 8 shows a sectional view of the freewheel hub 10. The radial tooth sets 94 and 96 of the first clutch ring 58 and of the hub sleeve 18, which are engaged with one another in a torque-transmitting manner in the drive direction, are discernible in FIG. 8. The teeth 100 of the second clutch ring 60 are engaged with the teeth 98 of the first clutch ring 58.

Of the teeth 98 of the first clutch ring 58, only portions of the sliding surfaces 102 are discernible. The second clutch ring 60 has a radial tooth set 112 which is engaged with a radial tooth set 114 on the driver sleeve 24 in a torque-transmitting manner. The radial tooth set 94 of the first clutch ring 58 and the radial tooth set 96 of the hub sleeve 18 are decoupled from one another in terms of vibration in the circumferential direction. To this end, an air gap is set between the radial tooth sets 94 and 96 in the freewheel mode. This air gap is set by the guide sleeves (not shown in FIG. 8). In the drive direction, the teeth of the radial tooth sets 94 and 96 bear against one another for torque transmission, as can be seen in FIG. 8.

Figure 9:
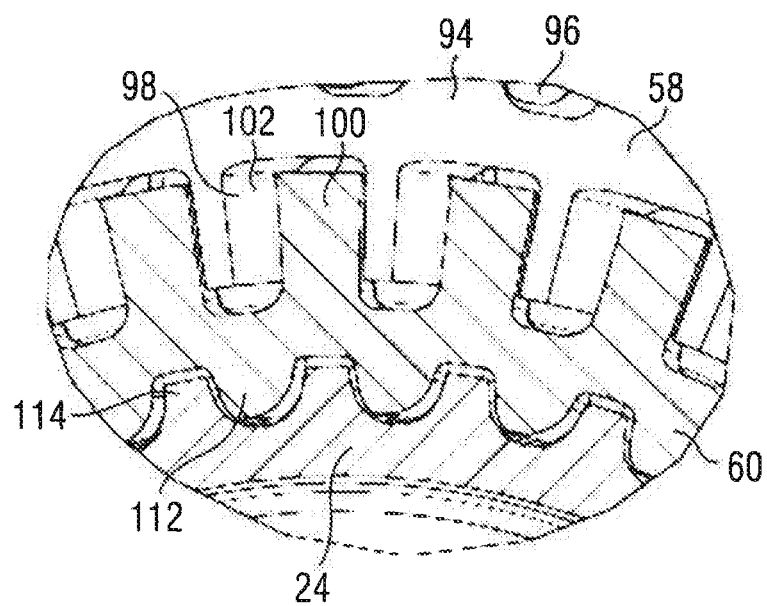
FIG. 9 shows an enlarged view of the detail IX in FIG. 8.

FIG. 9 shows an enlarged view of the detail IX in FIG. 8. The teeth 100 of the second clutch ring 60 are engaged with the teeth 98 of the first clutch ring 58. The radial tooth sets 112 and 114 of the driver sleeve 24 and of the second clutch ring 60 are likewise engaged with one another in a torque-transmitting manner.

In the following text, the transfer of the freewheel device 52 from the engaged position into the freewheel position is described with reference to FIGS. 10 to 12.

FIG. 10 shows the freewheel device 52, or the freewheel hub, in the engaged position, i.e. the clutch rings 58 and 60 are engaged with one another in a torque-transmitting manner. Formed on the guide sleeve 74, or the guide portion 104 thereof, is a shoulder 116. Between this shoulder 116 and the first clutch ring 58, a predetermined gap $s_1$ is set in the engaged position of the clutch rings 58 and 60. In the engaged position, the decoupling ring 62, which is connected to the second clutch ring 60, bears against an abutment surface 118 of the guide sleeve 74. The decoupling ring 62 slides on the hub sleeve 18 with its inner circumference.

In the position shown in FIG. 10, only the magnet 68 is "active". This means that only the attractive force of the magnet 68 acts on the clutch rings 58 and 60.

In order to trigger the transfer from the engaged position into the freewheel position of the freewheel device, a relative movement or relative rotation between the hub sleeve 18 and the driver sleeve 24 has to take place. As a result of this relative rotation between the hub sleeve 18 and the driver sleeve 24, the clutch rings 54 and 60 can be separated from one another.

FIG. 11 shows an intermediate position of the freewheel device 52 between the engaged position and the freewheel position. In this intermediate position, the teeth of the clutch rings 58 and 60 still overlap to a certain degree.

In FIG. 11, the gap $s_1$ (FIG. 10) has been closed and the first clutch ring 58 bears against the shoulder 116. The decoupling ring 62 still bears against the abutment surface 118. Compared with FIG. 10, the first clutch ring 58 has accordingly moved towards the left, in order to come into abutment with the shoulder 116. The displacement of the first clutch ring 58 to the left for abutment with the shoulder 116 on the guide sleeve 74 is brought about by the relative movement between the first clutch ring 58 and the second clutch ring 60, during which the sliding surfaces 102 and 104 of the teeth 98 and 100 of the clutch rings 58 and 60 slide against one another (FIGS. 4 to 7). As a result of this sliding movement, the first clutch ring 58 is displaced towards the left, since the second clutch ring 60 is kept in abutment with the abutment surface 118 of the guide sleeve 74 via the decoupling ring 62 on account of the attractive force of the magnets 78 on the guide sleeve 74. The movement of the first clutch ring 58 to the left takes place counter to the attractive force of the magnets 68 in the first clutch ring 58, since the magnets 68 try to pull the clutch rings 58 and 60 together by way of their attractive force. As a result of the movement of the first clutch ring 58 to the left, a gap $s_2$ is set between the first clutch ring 58 and the second clutch ring 60, i.e. the clutch rings 58 and 60 are already partially separated in the axial direction.

FIG. 12 shows the freewheel device 52 in the freewheel position, i.e. the first clutch ring 58 and the second clutch ring 60 are not engaged in a torque-transmitting manner. Compared with FIG. 11, the axial spacing between the first clutch ring 58 and the second clutch ring 60 has increased further. In FIG. 12, the larger spacing is now denoted $s_3$. The axial tooth sets 98, 100 of the first clutch ring 58 and of the second clutch ring 60, of which only the tooth 100 of the second clutch ring 60 is shown, have been completely separated from one another.

When FIG. 11 and FIG. 12 are compared, it is clear that the second clutch ring 60 with the decoupling ring 62 has moved to the right relative to the first clutch ring 58 in FIG. 12. The first clutch ring 58 is still on the shoulder 116 of the guide sleeve 74, but the decoupling ring 62 no longer bears against the abutment surface 118. As a result, the spacing $s_3$ between the first clutch ring 58 and the second clutch ring 60 is set.

The radial protrusion 64 on the decoupling ring 62 is furthermore discernible in FIGS. 10 to 12, said radial protrusion 64 serving to keep the first clutch ring 58 on the unit formed by the second clutch ring 60 and the decoupling ring 62 and nevertheless to allow a relative movement between the first clutch ring 58 and the second clutch ring 60 with the decoupling ring 62. The protrusion 64 and the second clutch ring 60 enclose the first clutch ring 58 between one another.

It is furthermore apparent from FIGS. 10 to 12 that the guide sleeve 74, with its shoulder 116 and the abutment surface 118, prevents the clutch rings 58 and 60 from being able to strike the hub sleeve 18 directly during the transition into the freewheel position and also back into the engaged position. To this end, the guide sleeve 74 also interacts with the decoupling ring 62, which can be supported on the abutment surface 118. This prevents oscillations or vibrations that occur during the transition of the clutch rings into the freewheel position or back into the engaged position from being able to be transmitted to the hub sleeve 18.

FIG. 19 shows a diagram of the attractive forces of the magnets 68 and 78, said attractive forces changing depending on the angular positions of the clutch rings 58 and 60. The individual curves shown in FIG. 19 can be assigned to the attractive forces of the magnet 68, of the magnet 78 and of the two magnets 68 and 78 depending on the positions, shown in FIGS. 10 to 12, of the clutch rings 58 and 60.

In the position shown in FIG. 10, only the magnet 68 on the first clutch ring 58 acts on the second clutch ring 60 with its attractive force and keeps the clutch rings 58 and 60 initially against one another. The curve of the summed attractive forces of the magnets 68 and 78 thus corresponds, in the portion "FIG. 10" of the diagram according to FIG. 19, only to the attractive force provided by the magnet 68, since the magnetic force of the magnet 78 is not yet acting on the clutch rings 58 and 60.

If the clutch rings 58 and 60 are rotated relative to one another during the transition into the freewheel position, the attractive force, acting on the second clutch ring 60, of the magnet 68 drops.

In the intermediate position shown in FIG. 11, the clutch rings 58 and 60 have been rotated relative to one another such that the magnet 78 also acts on the clutch rings 58 and 60 with a relatively large attractive force (see region "FIG.

11" in FIG. 19). Accordingly, the attractive force provided by the two magnets 68 and 78 is also initially relatively large again in the portion "FIG. 11". The attractive force of the magnets 68 and 78 then drops relatively greatly, however, the further the clutch rings 58 and 60 are rotated relative to one another. The clutch rings 58 and 60 are held against one another by the two magnets 68 and 78, although the first clutch ring 58 has been displaced towards the left in FIG. 11 and bears against the shoulder 116. As a result, the gap $s_2$ (FIG. 11) between the first clutch ring 58 and the second clutch ring 60 is formed. The clutch rings 58 and 60 are thus already partially separated in the axial direction (see gap $s_2$).

If the clutch rings 58 and 60 are rotated further with respect to one another and thus the axial spacing (gap $s_3$) between the two clutch rings 58 and 60 increases, both the attractive force of the magnet 68 and the attractive force of the magnet 78 is reduced, as is discernible in the portion marked "FIG. 12" of the diagram according to FIG. 19. The attractive forces of the magnets 68 and 78 drop further in a corresponding manner until the clutch rings 58 and 60 reach a predetermined angular position relative to one another. In this predetermined angular position of the clutch rings 58 and 60, the clutch rings 58 and 60 are also completely separated in the axial direction. This corresponds to the state shown in FIG. 12. In FIG. 12, the decoupling ring 62 has been lifted from the abutment surface 118 on the guide sleeve 74, such that the gap $s_3$ between the clutch rings 58 and 60 is formed. In FIG. 12, the two clutch rings have been completely separated from one another. Thus, the freewheel device 52 is in the freewheel position.

It is clear from FIG. 19, that the attractive forces of the magnets 68 and 78 change relative to one another depending on the angular positions of the clutch rings 58 and 60.

The freewheel device 52 ensures high magnetic attractive forces, which keep the clutch rings 58 and 60 against one another, but at the same time, on account of the strong drop in the attractive forces of the magnets 68 and 78 (see FIG. 19) with the changing angular positions of the clutch rings 58 and 60, allows rapid separation of the clutch rings 58 and 60 at the transition into the freewheel position.

Consideration should be given here to the fact that, in the freewheel position (FIG. 12), too, depending on the angular positions of the clutch rings 58 and 60 relative to one another, virtually the high attractive forces shown in FIG. 19 act on the second clutch ring 60, wherein the attractive forces are somewhat lower than the illustrated attractive forces on account of the axial spacing between the clutch rings in the freewheel position. As a result of these relative large attractive forces, the clutch rings 58 and 60 can also be transferred quickly from the freewheel position back into the engaged position, in which they are engaged with one another in a torque-transmitting manner. In other words, large attractive forces act on the second clutch ring 60 in predetermined angular positions of the clutch rings 58 and 60 relative to one another, and lower attractive forces in other predetermined angular positions. Given a continuous relative rotation of the clutch rings 58 and 60 in the freewheel position, this has the effect that the curves shown in FIG. 19 or similar curves of the attractive forces occur in large numbers one after another when the clutch rings 58 and 60 can rotate relative to one another in the freewheel position.

Figure 13:
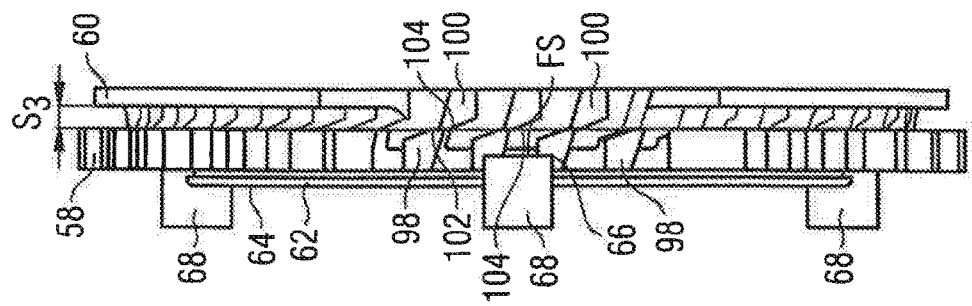
FIGS. 13 to 15 show enlarged views of the assembly formed by the decoupling ring and the two clutch rings during the transition from the engaged position into the freewheel position.
Figure 14:
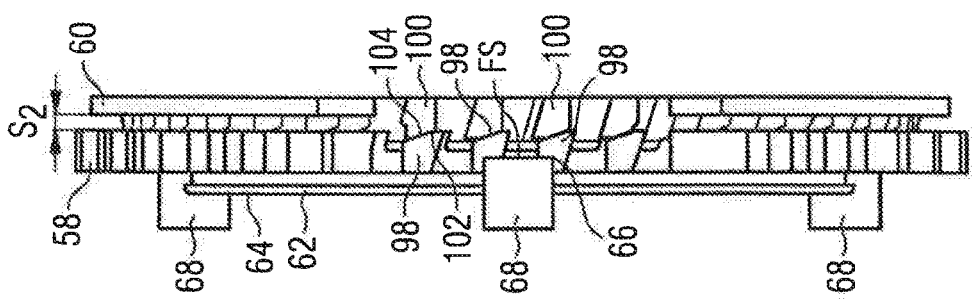
Figure 15:
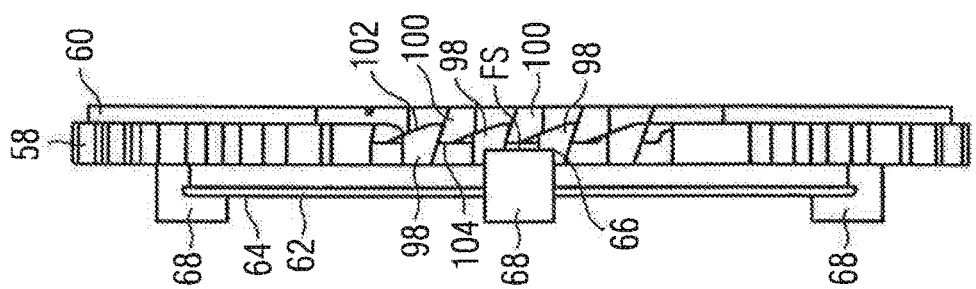

FIGS. 13 to 15 show views of the first clutch ring 58 and of the second clutch ring 60 with the decoupling ring 62 during the transition from the engaged position into the released position. The positions of the clutch rings 58 and 60 in FIGS. 13 to 15 correspond substantially to the positions shown in FIGS. 10 to 12 of the freewheel device 52.

The first clutch ring 58 with the magnets 68 is discernible in FIG. 13. The magnets 68 are accommodated in apertures 66 in the first clutch ring 58. The apertures 66 are configured between two adjacent teeth 98 in the first clutch ring 58. The functioning of the teeth 98 of the first clutch ring 58 is not impaired by the apertures 66 and the magnets 68. The second clutch ring 60 is connected to the decoupling ring 62. The decoupling ring 62 has a circumferential protrusion 64 which keeps the first clutch ring 58 on the unit made up of the decoupling ring 62 and second clutch ring 60.

The teeth 98 of the first clutch ring 58 have a sliding surface 102. The teeth 100 of the second clutch ring 60 similarly have a sliding surface 104. In the engaged position shown in FIG. 13, a sliding surface 102, 104 of a tooth 98 or 100 substantially spans the intermediate space between two adjacent teeth 98 or 100. A tooth 100 accordingly also spans, with its sliding surface 104, the surface portion FS of the magnet 68 which is exposed by the aperture 66 between two adjacent teeth 98. In other words, the surface portion FS, exposed by the aperture 66, of the magnet 68 accommodated in the aperture 66 corresponds in terms of area substantially to the sliding surface 104 of the tooth 100 of the second clutch ring 60.

FIG. 14 shows an intermediate position between the engaged position and the freewheel position. According to FIG. 14, a relative movement in the axial direction and at the same time a relative rotation between the first clutch ring 58 and the second clutch ring 60 has taken place. This occurs for example when the hub sleeve 18 (FIG. 1) with the first clutch ring 58 rotates more quickly than the driver sleeve 24 (FIG. 1) with the second clutch ring 60. In other words, in most cases, in which the freewheel hub 10 passes into the freewheel mode, no force is transmitted to the driver sleeve 24 via the chain drive—the chain drive is stationary—, wherein the hub sleeve continues to rotate with the first clutch ring 58. As a result of this relative rotation between the first clutch ring 58 and the second clutch ring 60, the sliding surfaces 102 and 104 of the teeth 98 and 100 slide against one another. As a result of the inclination of the sliding surfaces 102 and 104, the clutch rings 58 and 60 are separated in the axial direction during a corresponding relative rotation and the sliding of the sliding surfaces 102 and 104 against one another. The increasing axial spacing between the first clutch ring 58 and the second clutch ring 60 is again denoted $s_2$ in FIG. 14. In the position shown in FIG. 14, no tooth 100 of the second clutch ring 60 is located in the axial direction in front of the surface portion FS of the magnet 68. The magnetic attractive force exerted on the second clutch ring 60 by the magnet 68 in the first clutch ring 58 is accordingly low. If a tooth 100 is located with its sliding surface 104 immediately in front of the surface portion FS, the magnetic attractive force, exerted on the tooth 100, of the magnet 68 is relatively large. It is clear therefrom that the magnetic attractive force exerted on the second clutch ring 60 by the magnet 68 in the first clutch ring 58 changes depending on the angular positions of the first clutch ring 58 and of the second clutch ring 60 relative to one another. The reason for this is that the field lines of the magnetic field of the magnets 68 can emerge in an unimpeded manner in the direction of the second clutch ring 60 only from the surface portion FS. In all other regions, the magnetic field first of all has to propagate through the adjacent teeth 98 of the clutch ring 58 and is accordingly weaker.

FIG. 15 shows the first clutch ring 58 and the second clutch ring 60 in the freewheel position. The spacing $s_3$ between the first clutch ring 58 and the second clutch ring 60 has increased further compared with the spacing $s_2$ according to FIG. 14. The first clutch ring 58 bears virtually against the radial protrusion 64 on the decoupling ring 62. The sliding surfaces 102 and 104 have slid further against one another, with the result that the first clutch ring 58 and the second clutch ring 60 have been spaced further apart in the axial direction (see $s_3$). It is clear from FIG. 15 that a tooth 100 of the second clutch ring 60, although spaced apart from one another in the axial direction, is located in the axial direction in front of the surface portion FS of the magnet 68. In this position of the clutch rings 58 and 60, the magnetic attractive force exerted on the tooth 100 by the magnet 68 is again very large, since the tooth 100, or its sliding surface 104, virtually completely overlaps the surface portion FS of the magnet 68 which is exposed by the aperture 66. In this case, the magnetic field from the surface portion FS can act directly on the tooth 100 of the second clutch ring 60.

This has the advantage that the transition from the freewheel position shown in FIG. 15 into the engaged position shown in FIG. 13 can take place quickly on account of the high attractive force exerted on the teeth 100 of the second clutch ring 60 by the magnets 68. In the event of a relative rotation between the first clutch ring 58 and the second clutch ring 60, the attractive force, acting on the second clutch ring 60, of the magnets 68 can be switched on and off, so to speak. As stated above, the reason for this is that the magnetic field can change as a result of the different angular positions of the first clutch ring 58 relative to the second clutch ring 60. In the angular position, shown in FIG. 15, of the clutch rings 58 and 60, a large attractive force acts on the tooth 100 of the second clutch ring, since the tooth 100 completely overlaps the surface portion FS and the magnetic field can act directly on the tooth 100. The strong attractive force in this angular position ensures that, in the event of a relative rotation in the opposite direction between the first clutch ring 58 and the second clutch ring 60, the axial spacing between the first clutch ring 58 and the second clutch ring 60 is closed and the teeth 98 and 100 pass quickly and reliably into engagement with one another.

If FIGS. 13 to 15 are considered in the reverse order, FIGS. 13 to 15 also show the transition from the freewheel position according to FIG. 15 into the engaged position according to FIG. 13. In other words, in the event of a reverse relative rotation, the clutch rings 58 and 60 are pulled together by the magnets 68. The sliding surfaces 102 and 104 of the teeth 98 and 100 slide against one another until they are fully engaged in a torque-transmitting manner.

Figure 16:
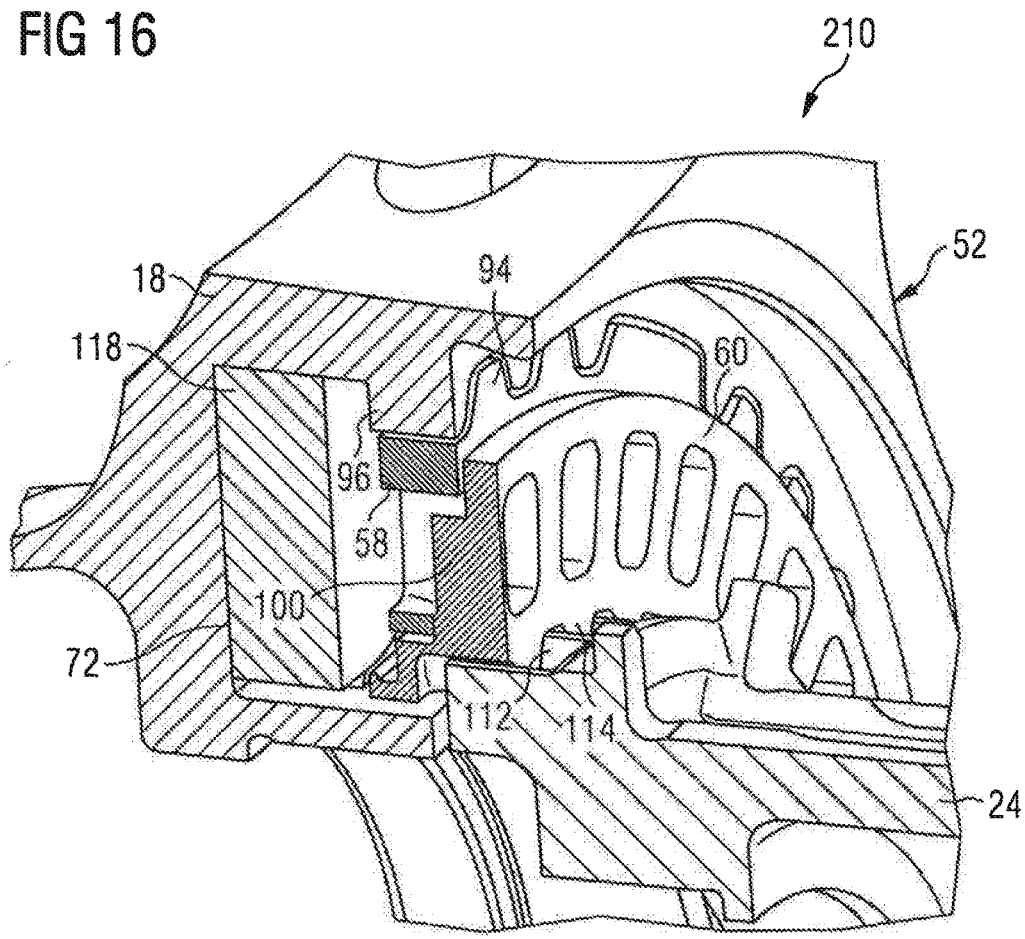
FIG. 16 shows a front view of a freewheel hub according to a second embodiment.

FIG. 16 shows a partially broken-open perspective view of a freewheel hub 210 according to a second embodiment. The same reference signs as in the first embodiment are used for components that are of the same type or have the same effect.

The freewheel hub 210 has a hub sleeve 18 and a driver sleeve 24. The freewheel device 52 is provided between the hub sleeve 18 and the driver sleeve 24. The freewheel device 52 comprises the first clutch ring 58 and the second clutch ring 60. The driver sleeve 24 is engaged in a torque-transmitting manner via its radial tooth set 112 with the radial tooth set 114 of the second clutch ring 60. The same goes for the hub sleeve 18 and the first clutch ring 58. The hub sleeve 18 has a radially inward directed radial tooth set 96, which is engaged in a torque-transmitting manner with the radially outward directed radial tooth set 94 of the first clutch ring 58.

The hub sleeve 18 also has recesses 72. A sound-reducing element 120 is accommodated in the recesses 72 in FIG. 18. The sound-reducing elements 120 can be sound-absorbing elements or sound-deadening elements. The sound-absorbing elements 120 can be pressed easily into the recess 72.

Figure 17:
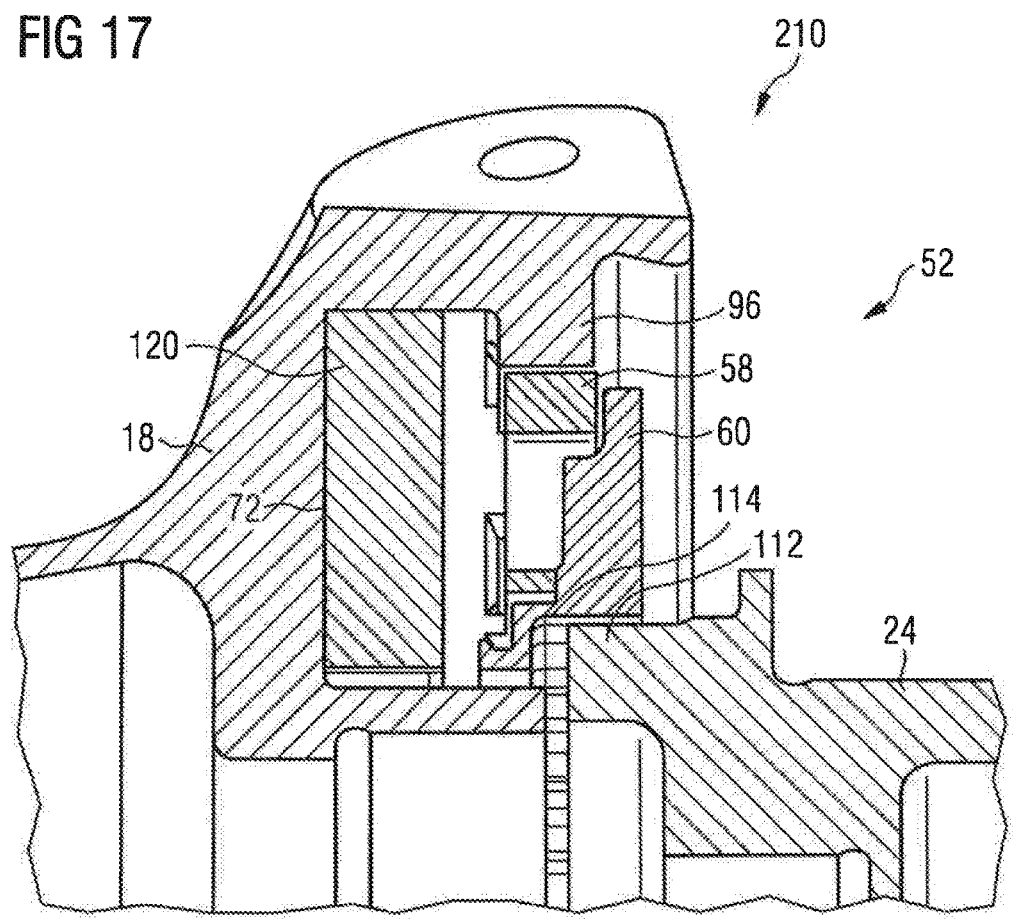
FIG. 17 shows a sectional view of the freewheel hub according to the second embodiment.

FIG. 17 shows a sectional view of the freewheel hub 210. In the view according to FIG. 17, the sound-absorbing or sound-deadening element 120 which is accommodated in the recess 72 in the hub sleeve 18 is again discernible. The element 120 for sound deadening or sound absorption is located in the immediate vicinity of the first clutch ring 58 and of the second clutch ring 60, which can emit unpleasant noise during transfer from the freewheel position into the engaged position. This noise is absorbed or deadened by the sound-absorbing or sound-deadening element 120 and thus does not pass outwards in order to have a negative effect on the driver and his environment.

Figure 18:
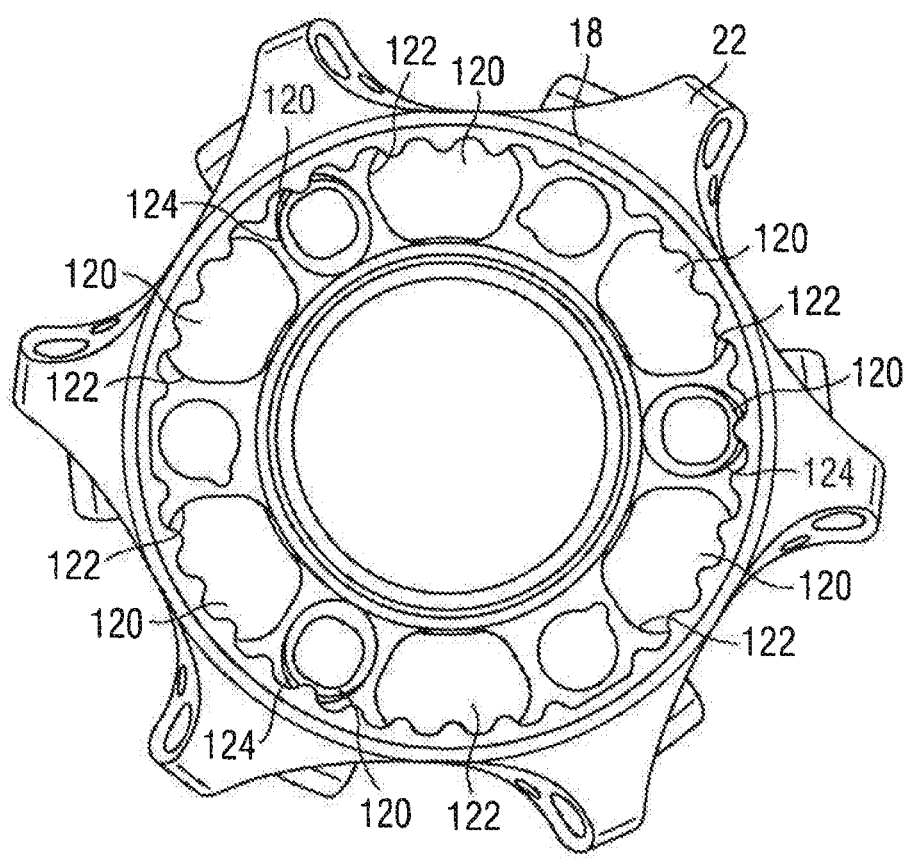
FIG. 18 shows a further sectional view of the freewheel hub according to the second embodiment.

FIG. 18 shows a front view of a hub sleeve 18 with the spoke flange 22 provided thereon. The hub sleeve 18 has various recesses 122 and 124. The recesses 122 are configured in an oval manner. The recesses 124 are configured in an annular manner. Sound-absorbing or sound-deadening elements 120, which match the shape of the particular recess, are pressed into the recesses 122 and 124.

The invention claimed is:

1. A freewheel hub for a bicycle, comprising:
a hub axle,
a hub sleeve which is mounted rotatably on the hub axle via a bearing arrangement,
a driver which is mounted rotatably on the hub axle and is connectable to at least one sprocket arrangement,
wherein a freewheel device arranged between the hub sleeve and the driver has at least one first clutch ring and at least one second clutch ring, wherein the first clutch ring is coupled or coupleable to the hub sleeve in a torque-transmitting manner, and wherein the second clutch ring is coupleable or coupled to the driver in a torque-transmitting manner, wherein the two clutch rings have mutually facing axial tooth sets, and wherein the first and the second clutch ring are displaceable axially relative to the hub axle between an engaged position, in which the tooth sets are engaged with one another in a torque-transmitting manner, and a freewheel position, in which the tooth sets are not engaged with one another to allow relative rotation between the hub sleeve and the driver,
wherein at least one magnet arrangement is accommodated in apertures in the first clutch ring or the second clutch ring to keep the clutch rings in the engaged position, the apertures for accommodating the magnet arrangement arranged in the first clutch ring or the second clutch ring such that, in the event of relative rotation between the first and second clutch rings, the clutch rings are movable in the axial direction from the engaged position into the freewheel position and back again, wherein the apertures in the first clutch ring or the second clutch ring are further configured such that a tooth of the axial tooth set of the other of the first clutch ring or of the second clutch ring covers a surface portion of the magnet accommodated in the aperture in the engaged position.

2. The freewheel hub according to claim 1, wherein the apertures in the first clutch ring or in the second clutch ring are arranged at least in part between two adjacent teeth of the axial tooth set of the first clutch ring or of the second clutch ring, wherein the magnet accommodated in the particular aperture spans a region between adjacent teeth, said region corresponding substantially to a tooth of the other of the first clutch ring or of the second clutch ring in the engaged position.

3. The freewheel hub according to claim 2, wherein the surface portion, exposed by the aperture, of the magnet accommodated in the aperture corresponds in terms of area substantially to a sliding surface of a tooth of the first clutch ring or of the second clutch ring.

4. The freewheel hub according to claim 1, wherein at least one guide sleeve is provided on the hub sleeve, the at least one guide sleeve configured to guide at least the first clutch ring in the direction of the hub sleeve and to decouple the hub sleeve from the freewheel device in terms of vibration in the circumferential direction.

5. The freewheel hub according to claim 4, wherein at least one magnet is accommodated in the at least one guide sleeve.

6. The freewheel hub according to claim 5, wherein the attractive force provided by the at least one magnet in the at least one guide sleeve is variable depending on the angular positions of the first clutch ring and of the second clutch ring relative to one another.

7. The freewheel hub according to claim 4, wherein at least the first clutch ring further comprises at least one recess for accommodating the at least one guide sleeve.

8. The freewheel hub according to claim 7, wherein the at least one recess in the first clutch ring for accommodating the at least one guide sleeve is further configured such that the at least one recess is covered at least in part by a tooth of the second clutch ring in the engaged position.

9. The freewheel hub according to claim 4, wherein the at least one guide sleeve is mounted in a vibration-damping manner on the hub sleeve.

10. The freewheel hub according to claim 4, wherein the at least one guide sleeve sets a predetermined air gap between the magnet accommodated therein and the clutch rings.

11. The freewheel hub according to claim 4, wherein a predetermined clearance between a radial tooth set of the hub sleeve and a radial tooth set at least of the first clutch ring is adjustable with the at least one guide sleeve.

12. The freewheel hub according to claim 1, wherein at least one guide sleeve is provided on the hub sleeve, the at least one guide sleeve configured to guide at least the second clutch ring in the direction of the hub sleeve and to decouple the hub sleeve from the freewheel device in terms of vibration in the circumferential direction.

13. The freewheel hub according to claim 1, wherein the attractive force provided by the at least one magnet arrangement is variable depending on the angular positions of the first clutch ring and of the second clutch ring relative to one another.

14. The freewheel hub according to claim 13, wherein the first clutch ring and the second clutch ring are further configured such that, in at least one predetermined angular position of the first clutch ring relative to the second clutch ring, only the attractive force of the at least one magnet arrangement acts on the second clutch ring.

15. The freewheel hub according to claim 13, wherein the first clutch ring and the second clutch ring are further configured such that, in at least one predetermined angular position of the first clutch ring relative to the second clutch ring, the attractive forces of the at least one magnet arrangement and of at least one magnet in at least one guide sleeve jointly act on the second clutch ring.

16. The freewheel hub according to claim 1, wherein at least the first clutch ring is further configured to be decouple-able from the hub sleeve in terms of vibration at least in the axial direction via at least one decoupling element.

17. The freewheel hub according to claim 16, wherein at least the second clutch ring is further configured to be decoupleable from the hub sleeve in terms of vibration at least in the axial direction via the at least one decoupling element.

18. A freewheel hub for a bicycle, comprising:
a hub axle,
a hub sleeve which is mounted rotatably on the hub axle via a bearing arrangement,
a driver which is mounted rotatably on the hub axle and is connectable to at least one sprocket arrangement,
a freewheel device which is arranged between the hub sleeve and the driver and optionally allows relative rotation between the hub sleeve and the driver or couples the hub sleeve and the driver in a torque-transmitting manner,
wherein the freewheel device has at least one first clutch ring and at least one second clutch ring, wherein the first clutch ring is coupled or coupleable to the hub sleeve in a torque-transmitting manner, and wherein the second clutch ring is coupleable or coupled to the driver in a torque-transmitting manner, wherein the two clutch rings have mutually facing tooth sets, and wherein the first and the second clutch ring are displaceable axially relative to the hub axle between an engaged position, in which the tooth sets are engaged with one another in a torque-transmitting manner, and a freewheel position, in which the tooth sets are not engaged with one another,
wherein the freewheel device is decoupled from the hub sleeve in terms of vibration via at least one decoupling device.

19. The freewheel hub according to claim 18, wherein the at least one decoupling device comprises at least one decoupling element which prevents at least the first clutch ring from striking the hub sleeve axially.

20. The freewheel hub according to claim 19, wherein the at least one decoupling element comprises at least one decoupling ring which forms an assembly together with the first clutch ring and the second clutch ring.

21. The freewheel hub according to claim 20, wherein the at least one decoupling ring and the second clutch ring are connected together such that a relative movement in the axial direction and in the circumferential direction between the first clutch ring and the at least one decoupling ring connected to the second clutch ring is possible.

22. The freewheel hub according to claim 18, wherein the at least one decoupling device comprises at least one decoupling element which prevents at least the second clutch ring from striking the hub sleeve axially.

23. The freewheel hub according to claim 18, wherein the at least one decoupling device has at least one guide sleeve, wherein the at least one guide sleeve is provided on the hub sleeve.

24. The freewheel hub according to claim 23, wherein the at least one guide sleeve has at least one stop for the first clutch ring.

25. The freewheel hub according to claim 23, wherein the at least one guide sleeve has at least one abutment surface for the abutment of at least one decoupling element.

26. The freewheel hub according to claim 1, further comprising at least one second magnet arrangement axially displaceable and rotationally constrained relative to the at least one magnet arrangement.

* * * * *